United States Patent
Pieck et al.

[11] Patent Number: 5,814,770
[45] Date of Patent: Sep. 29, 1998

[54] CABLE CLOSURE

[75] Inventors: Amandus Lucien Emiel Pieck, Kortenaken; Etienne Laeremans, Scherpenheuvel; Marc Demesmaeker, Antwerpen, all of Belgium

[73] Assignee: Raychem Corporation, Menlo Park, Calif.

[21] Appl. No.: 635,947
[22] PCT Filed: Nov. 8, 1994
[86] PCT No.: PCT/GB94/02443
§ 371 Date: May 1, 1996
§ 102(e) Date: May 1, 1996
[87] PCT Pub. No.: WO95/13642
PCT Pub. Date: May 18, 1995

[30] Foreign Application Priority Data

Nov. 8, 1993 [GB] United Kingdom .................. 9322929

[51] Int. Cl.⁶ .................................................. H02G 11/00
[52] U.S. Cl. ............................................. 174/135; 174/92
[58] Field of Search .............................. 174/69, 92, 135; 248/56, 68.1; 439/445, 455, 457; 411/15

[56] References Cited

U.S. PATENT DOCUMENTS

| | | |
|---|---|---|
| 3,186,051 | 6/1965 | Waddell ................................ 24/125 X |
| 3,337,681 | 8/1967 | Smith ..................................... 174/92 |
| 3,638,169 | 1/1972 | Caveney et al. ..................... 339/107 |
| 3,728,467 | 4/1973 | Klayum et al. ....................... 174/38 |
| 3,779,494 | 12/1973 | Nicholson et al. ................... 248/56 |
| 4,223,178 | 9/1980 | Lass .................................. 174/54 R |
| 4,719,321 | 1/1988 | Kozel et al. ......................... 174/135 |
| 4,859,809 | 8/1989 | Jervis .................................... 174/92 |
| 4,927,366 | 5/1990 | Tommerson et al. ................ 439/37 |
| 4,990,102 | 2/1991 | Myers ................................. 439/452 |
| 5,111,001 | 5/1992 | Jervis .................................. 172/92 |
| 5,251,959 | 10/1993 | De Braal et al. ............... 297/344.1 X |

FOREIGN PATENT DOCUMENTS

| | | | |
|---|---|---|---|
| A 0 189 240 | 7/1986 | European Pat. Off. ............ 156/49 |
| 0 353 539 A1 | 2/1990 | European Pat. Off. ....... H01R 13/58 |
| A 2 218 672 | 9/1974 | France . | |
| A 2 512 288 | 3/1983 | France .......................... 339/103 C |
| 1388736 | 3/1975 | United Kingdom ................ 174/135 |
| 2 140 225 | 11/1984 | United Kingdom .......... H01R 13/58 |
| 2 172 448 | 9/1986 | United Kingdom ............ H02G 3/22 |

*Primary Examiner*—Kristine L. Kincaid
*Assistant Examiner*—Chau N. Nguyen
*Attorney, Agent, or Firm*—Herbert G. Burkard

[57] ABSTRACT

A cable enclosure having a housing and a strain-relief device. The housing has an inlet for a cable, and the strain-relief device can be connected to the cable and the housing in a strain-relieving fashion. The strain-relief device can be connected to the housing after the strain-relief device has been secured to the cable and after the housing has been sealed around the cable.

24 Claims, 7 Drawing Sheets

CABLE CLOSURE

BACKGROUND OF THE INVENTION

The present invention relates to a splice case for encapsulating conductors, particularly in a telephone system and is especially suitable for buried or other outdoor use.

It is frequently necessary to protect conductor splices from the environment in order that they may continue to function properly for a life-time that may extend to several tens of years. Thus, the splice may be encapsulated by some means, preferably in a fashion that allows easy access to the splice (known as re-entry) for repair or rearrangement of conductors without destroying the original encapsulation.

U.S. Pat. No. 4,610,738 (Jervis), the disclosure of which is incorporated herein by reference, relates to a splice case suitable for sealing connections between a small pair count telecommunications cable, and a plurality of drop wires. It may also seal connections between drop wires themselves.

The splice case comprises:

at least one gel having a cone penetration value from approximately 100 to 350 ($10^{-1}$ mm) and an ultimate elongation of at least approximately 200%;

first and second open containers for containing said gel, an exposed first surface of said gel in the first container having a cross-sectional area which exceeds a second cross-sectional area of an exposed second surface of said gel in the second container, said first and second surfaces adapted for confronting and contacting each other, the first and second containers being sized so as to be capable of telescopically mating in a vicinity of the first and second surfaces; and spring means exerting a resilient force for continuously maintaining said first and second containers biased towards one another over a finite range with at least a threshold force.

U.S. Pat. No. 4,859,809 (Jervis), the disclosure of which is incorporated herein by reference, discloses a splice case for encapsulating a conductor splice, which comprises:

a first hollow part;

a second part, preferably hollow and preferably substantially identical to or substantially a mirror image of the first part, that can be positioned adjacent the first parts such that the first and second parts together define an enclosed space; a sealing material having a cone penetration value from 100–350 ($10^{-1}$ mm) and an ultimate elongation of at least 200%, the sealing material being within the first hollow part, and preferably where hollow also within the second part; and a spring for forcing the first and second parts together thereby putting the sealing material under pressure, the first part and/or second part having a deformable surface, and the spring being so shaped as to cause said surface to be deformed towards the sealing material thereby putting the sealing material under compression.

The spring preferably comprises a resilient elongate member shaped as at least three interconnected segments each segment being of re-entrant shape and comprising a first portion that can bear against a surface of the first part, preferably the deformable surface, and a second portion that can bear against a surface of the second part, preferably the deformable surface, and a third portion that interconnects the first and second portions.

Whilst the splice cases disclosed in these two patents can provide excellent sealing, are robust and reliable and can allow easy, clean re-entry a disadvantage can be felt under unfavourable conditions. Occasionally, it is desirable that greater strain relief be provided between the ingoing cables and the first and second parts constituting the splice case housing. For example, a greater axial pull strength, bending strength, or torsional strength might be required if conductors of the cables are not to risk damage on maltreatment of the splice case.

SUMMARY OF THE INVENTION

We have therefore designed a strain-relief device for a splice case that preferably can be mounted on ingoing cables independently from the splice case proper and can be subsequently joined to it in strain-relieving fashion after the housing has been sealed around the cable. This has various benefits, including avoidance of the need for a separate housing design for each cable size and each cable configuration.

Thus, the present invention provides a cable enclosure, preferably a cable splice case, that comprises:

(a) a housing having an inlet for a cable; and
(b) a strain-relief device that can be connected to the cable and to the housing in strain-relieving fashion;

in which the strain-relief device can be thus connected to the cable after it has been secured to the cable and after the housing has been sealed around the cable.

The strain-relief device may be pre-affixed to the housing in a loose fashion simply for example to prevent it becoming mislaid. For example it may be secured at the end of a cord or tie wrap. The join between the two parts that provides the desired strain-relief will, however, be capable of being made after the strain-relief device has been secured to the cable.

The invention can therefore separate the two steps of environmental sealing, namely by closing or otherwise sealing the housing around the cable, and strain-relief.

In many prior art cable splices connection of a strain relief device to a housing and to a cable sealed by the housing occur simultaneously. An example is the use of a hose clamp around a cable outlet, or heat-shrinkage of an outlet, to make a mechanical seal to a cable it contains.

Other splice cases, such as that disclosed in U.S. Pat. No. 3,728,467 (Reliable Electric Company) include a strain-relief clamp as a permanent attachment. Here a ready-access closure comprises a dome-shaped cover that is attached to a base having two cable inlets. The base has fixed to it a clamping means providing strain-relief which is tightened around the ingoing cables. Even though tightening of the clamp can be carried out after the closure has been sealed closed (there is an additional internal clamp that, when tightened, provides an environmental seal) the housing and the clamp are necessarily positioned around the cables simultaneously.

We prefer that the strain-relief device comprise:

(a) a first part that can be attached to the cable adjacent the housing; and
(b) an arm attached to the first part and movable with respect to it to bring a distal end thereof into contact with the housing, the distal end having means for then engaging the housing.

The first part may comprise two sub-parts that can be assembled around the cable, and where two cables (or more) extend into the housing the first part may comprise three sub-parts that can be assembled around the cables preferably with one part between the cables and one part at either side of the two cables. The various sub-parts may be attached to one another by any suitable means such as interference fit, wedge fitting, nut and bolt, screw thread, or by means of a separate clamp.

In general, each sub-part will have a hole therethough that in cross-section corresponds to part of the cross-section of a cable, and will generally be substantially semi-circular in cross-section. The hole may be lined with, for example, an adhesive or a friction-increasing strip.

The arm may be pivotally moveable with respect to the first part, in which case it can be attached by a hinge, for example, a living hinge. The arm and the first part may therefore be integral, and the device may therefore be formed as a simple one-piece moulding. Instead of pivotal movement the arm may bend, and the bend may extend along a significant length of the arm. Where the arm is pivotally attached to the first part, we prefer that pivoting occur along an axis that is substantially perpendicular to the cable and that it outside the cable. The axis may however run through the cable, in which case the direction of the axis of the pivot may cause the arm naturally to engage the housing once it has been swung towards the housing.

It may be desirable that strain between the cable and the housing be not transmitted through any hinge etc. joining the arm to the first part because, at least in the case of a living hinge, excessive stiffness would be required. We prefer therefore that movement of the arm that brings a distal end thereof into engagement with the housing causes engagement between a proximal portion of the arm and a strain-relief catch of the first part. In a preferred embodiment the arm has a hole (or projection) that mates with a projection (or hole) of the first part when the arm is moved. The projection and hole may be a short distance, preferably from 0.5 to 2 cm, from the hinge.

The means for engaging the housing preferably comprises a peg that can be inserted into a hole in the housing, or a hole into which a projection of the housing extends. Such a hole in the housing is preferably blind, but it may extend entirely through the thickness of the wall of the housing especially if the housing contains a sealing material that prevents contaminants passing through the hole to conductors within the housing. The hole need not be closed in cross-section, and it may for example comprise a mere recess in a projection on the surface of the housing. The peg may have a barb at its outer surface, which may extend around the periphery of the peg and have the form of a collar, that can engage a wall defining the hole in the housing thereby resisting removal of the peg from the hole. Such snap-fitting may be facilitated if the peg is hollow and/or has axially-extending slits, preferably running from the distal end of the peg, such that its cross-sectional size can be reduced. Such a peg can be snap-fitted into the hole in the housing and, if desired, a plug may then be positioned in the hollow of the peg, thereby resisting a future reduction in cross-sectional size of the peg that would be required for removal of the peg from the hole. Alternatively, the plug may cause an increase in cross-sectional size of the peg, again resisting its removal from the hole.

In order that such a plug be always to hand it may be attached to the arm, or other part of the device, by a flexible extension that allows it to be removably positioned in the hollow of the peg. Alternatively, the plug may be attached to the arm by a break-off extension.

The device of the invention is particularly useful in conjunction with a housing that comprises:

a first hollow housing part;

a second housing part, that is preferably hollow, that can be positioned adjacent to the first housing part such that the first and second housing parts define an enclosed space;

a sealing material within the first hollow part that preferably has a cone penetration value from 10–350 ($10^{-1}$ mm) and preferably has an ultimate elongation of at least 200%, and that preferably comprises a gel;

a spring for forcing the first and second housing parts together;

the first housing part and/or the housing part being so shaped as to cause a surface thereof to be deformed towards the sealing material thereby putting the sealing material under pressure when the spring engages the first and second housing parts. An end of the spring may extend into a hole in the housing allowing pivoting of the spring with respect to the housing between a position where the spring does not force the first and second housing parts together to a position where the spring forces them together. This hole for receiving the spring may be the same hole as that which receives the peg mentioned above. The peg, and where necessary also a plug that can be used with it, may have a hole or recess therein to accommodate the spring.

Instead of the first and/or housing parts having a deformable surface, they may be substantially rigid and one may telescope within the other in order that the housing be closed and the sealing material be put under pressure.

Thus, a housing substantially as disclosed in U.S. Pat. No. 4,610,738 or in U.S. Pat. No. 4,859,809 may be used in the present invention.

BRIEF DESCRIPTION OF THE DRAWINGS

The invention is further illustrated with respect to the following drawings, in which.

DESCRIPTION OF THE PREFERRED EMBODIMENTS

Figure 1A:
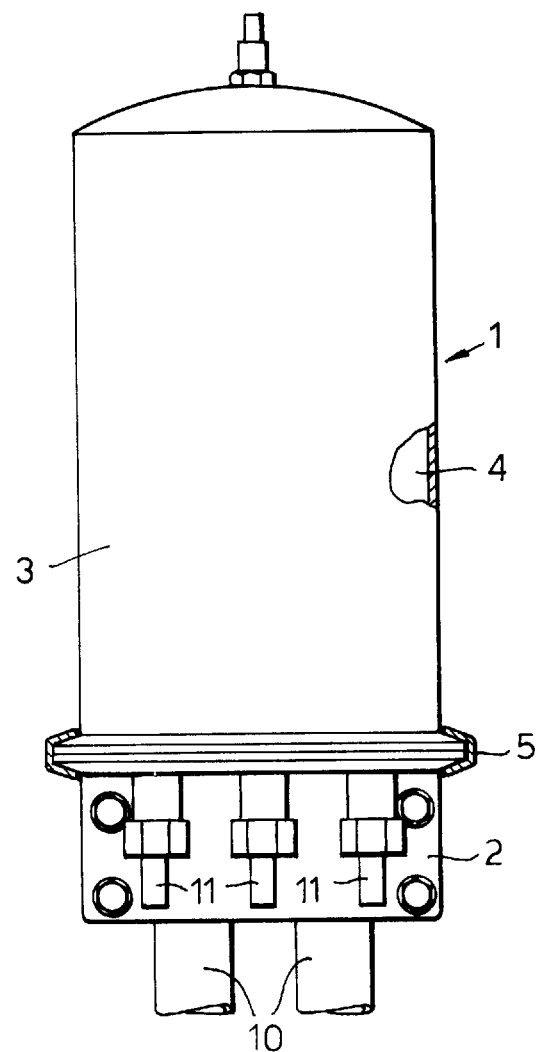
FIGS. 1–3 show prior art cable splice cases.
Figure 1B:
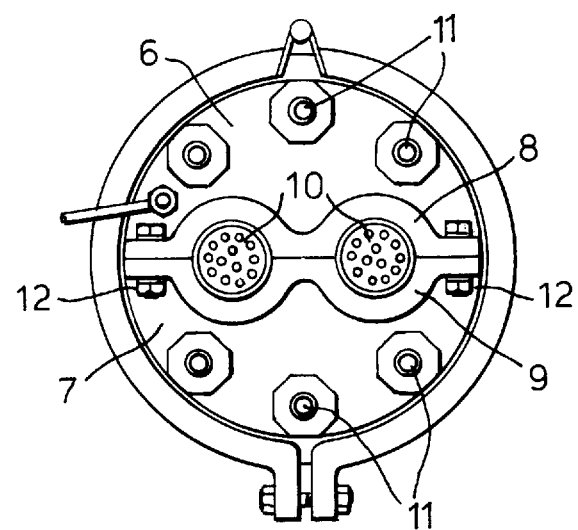

FIGS. 1a and 1b show in side elevation and plan view from below a splice case disclosed in U.S. Pat. No. 3,728,467 (Reliable Electric Company). A splice case 1 is formed by a base 2 and cover 3 which together define an enclosed space 4. The base and cover are held together by means of an O-clamp 5. The base comprises two sections 6,7 which carry clamp parts 8,9 which define inlet ports for a looped cable 10. Drop wires are connected to conductors of that looped cable within enclosed space 4 and those drop wires leave the base via ports 11. The clamps 8,9 are joined together by bolts 12 thereby providing strain-relief between the base 2 and the cables 10.

Figure 2A:
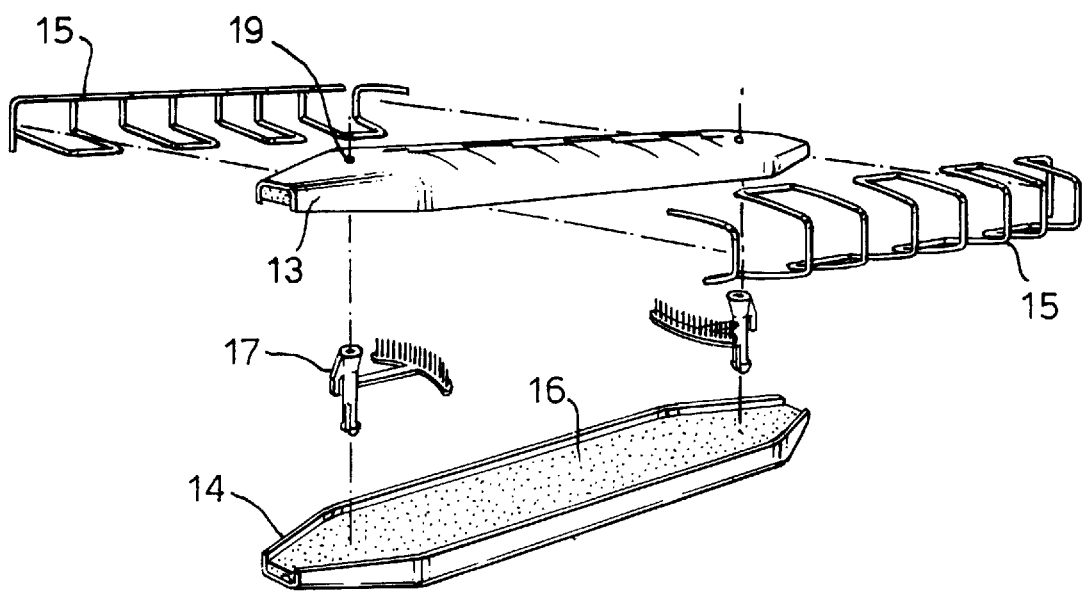
Figure 2B:
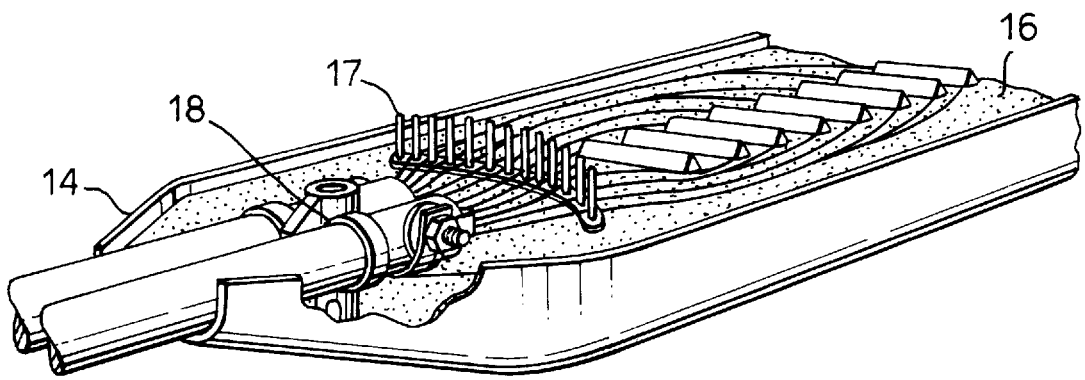

The splice case illustrated in FIGS. 2a and 2b is disclosed in U.S. Pat. No. 4,859,809 (Raychem) such a splice case is marketed by Raychem under the trade mark Gelsnap.

This splice splice closure comprises first and second hollow housing parts 13,14 that can be positioned adjacent one another to define an enclosed space, and that can be forced together by means of springs 15 to deform surfaces of the housing parts thereby putting a gel 16 within them under pressure. A conductor organizer 17 may be provided within the housing parts, as may a strain-relief device 18. A hole 19 may be provided in the housing parts into which an end of the spring 15 may be positioned such that the spring can then be swung in the plane of the splice closure between a position where the spring does not force the first and second housing parts together to a position where the spring forces them together.

Figure 3:
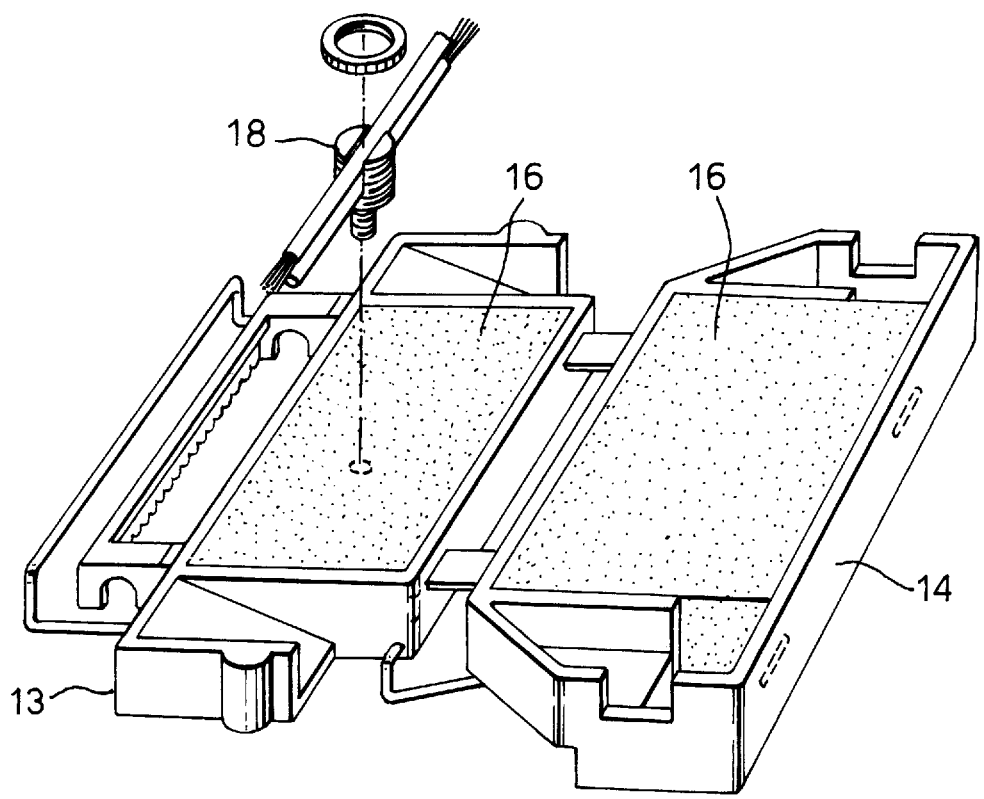

The splice case of FIG. 3 is disclosed in U.S. Pat. No. 4,610,738 (Jervis). Again it comprises two parts 13,14 but here they are substantially rigid and one can move telescopically within the other to put a gel 16 within them under pressure. A strain-relief device 18 is positioned within the enclosure.

Figure 4A:
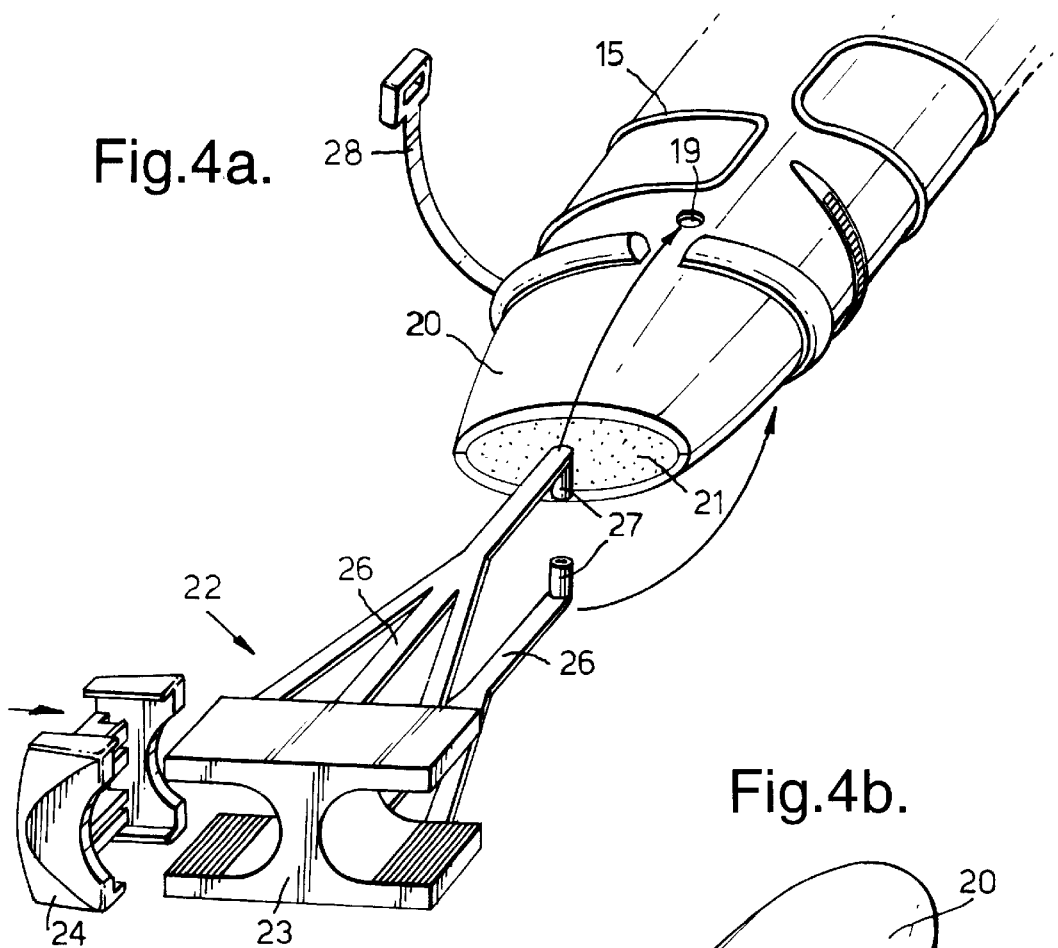
FIGS. 4a and 4b show a strain-relief device of the invention being attached to a housing.
Figure 4B:
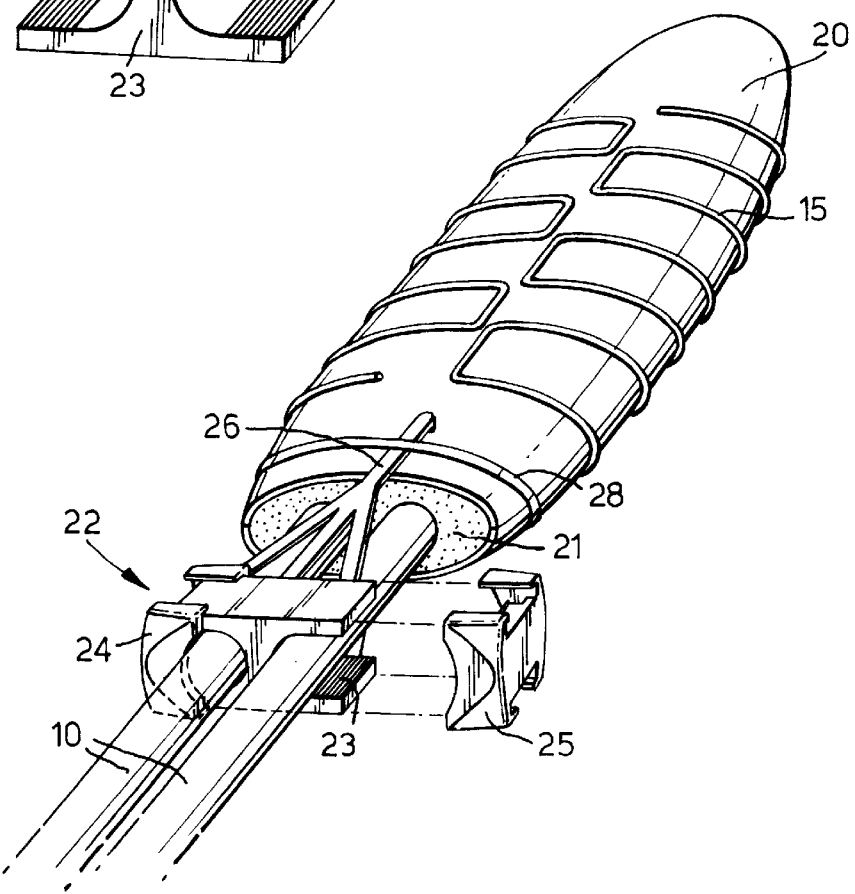

A strain-relief device of the invention is shown in the remaining figures. In FIGS. 4a and 4b the new device is shown before and after attachment to a housing of the type disclosed in U.S. Pat. No. 4,859,809 and in FIGS. 2a and 2b above. A cable enclosure is therefore illustrated comprising a housing 20 having an inlet 21 for a pair of cables 10, and a strain-relief device 22. The strain-relief device 22 can be seen to be able to be connected to the housing 20 after it has been secured to the cables 10 and after the housing 20 has been sealed around the cables 10. In FIG. 4b a part of this strain-relief device is shown disassembled for clarity. Even though connection of the strain-relief device to the housing can be the last step to be carried out, it may be preferred that final tightening of the strain-relief device to the cables 10 be carried out last. The inlet at the end of the housing 20 can be seen to be able to accommodate various numbers and sizes of cables. If the housing itself, or some part permanently fixed thereto, were to provide strain-relief to the cables it would need to be specially shaped for each cable size and configuration. The separate device of the invention can avoid that requirement.

The strain-relief device 22 comprises a first part that, in the embodiment illustrated, comprises three sub-parts 23, 24 and 25 that can be attached to the cables 10, and an arm 25 that is attached to the first part and is moveable with respect to it to bring a distal end thereof into contact with the housing 20, the distal end having a peg or other means 27 for engaging a hole 19 in the housing. The arm may be of any suitable shape and it need not comprise one or more thin struts as illustrated. If could instead be, for example, substantially sheet-like.

The housing 20 illustrated comprises two parts that are held together by a spring 15 and/or a tie wrap 28. The tie wrap may also or alternatively help to retain the peg 27 in the hole 19.

Figure 5A:
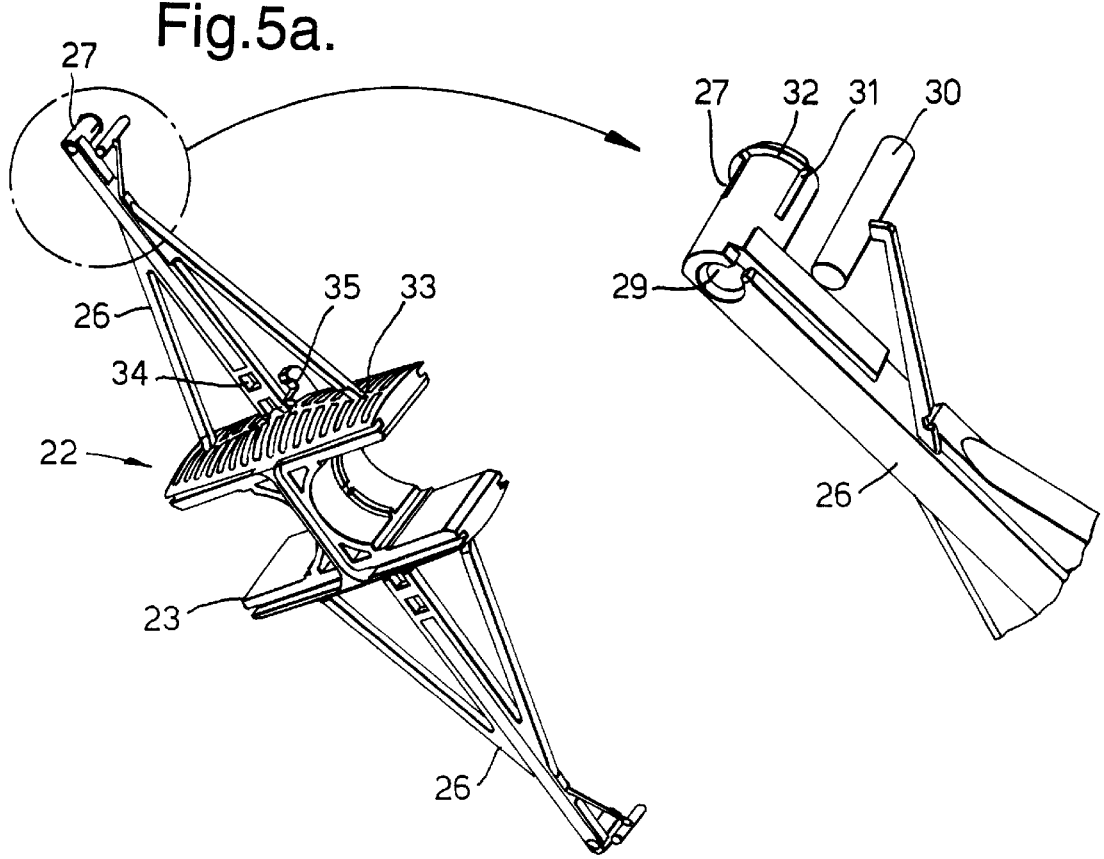
FIGS. 5a and 5b show the strain-relief device.
Figure 5B:
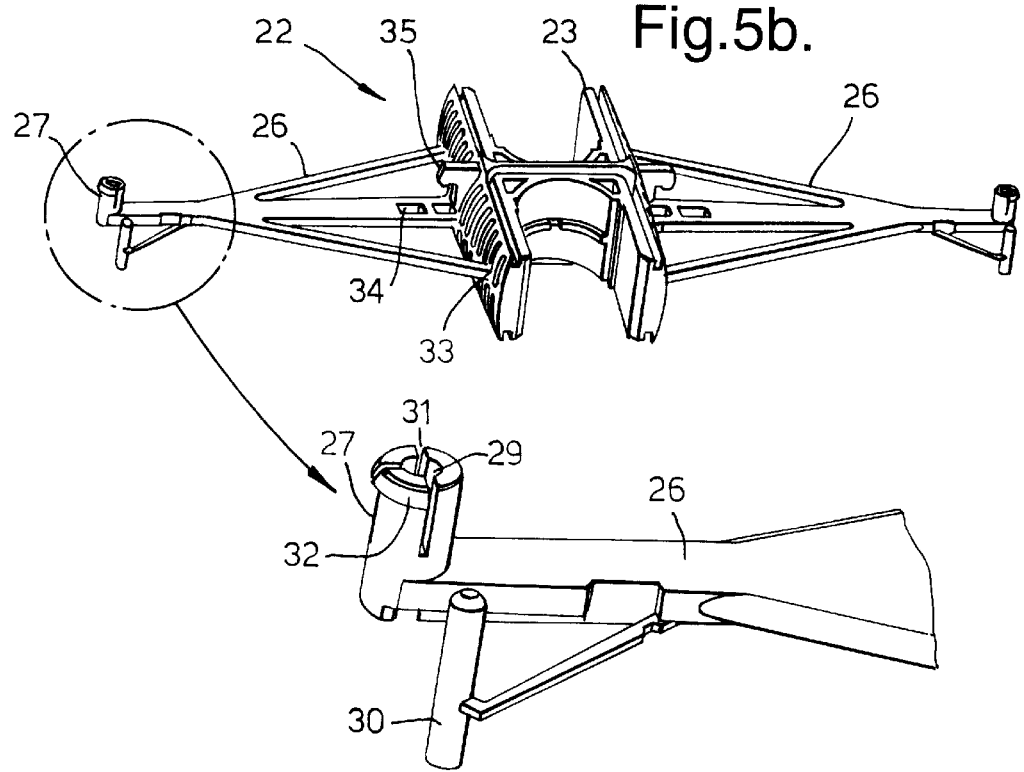
Figure 6A:
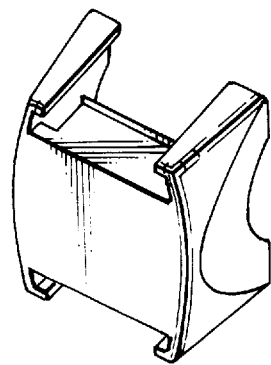
FIGS. 6a to 6e show a sub-part of the strain-relief device.
Figure 6B:
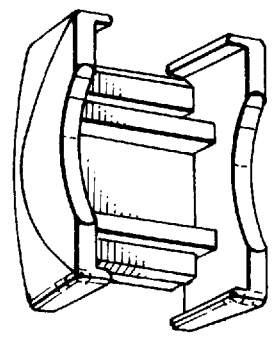
Figure 6C:
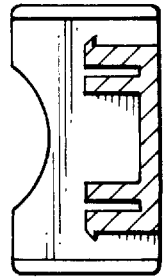
Figure 6D:
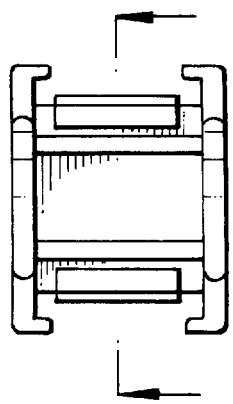
Figure 6E:

The device of the invention is shown in more detail in FIGS. 5a and 5b, each of which includes an inset showing a magnified view of a distal end of the arm of the device.

Each arm 26 has a peg 27 at or towards its end which is hollow as shown at 29 for receipt of a plug 30. The plug 30 is shown attached to the arm 26 by means of a hinged, or break-off, extension. The extension, or the hinge joining it to the arm 26, may be sufficiently flexible that the plug 30 can be moved in a direction substantially parallel to its length, as well as in a perpendicular direction, in order to position it in hollow 29. The arm 26 may have a recess as drawn running along at least part of its length into which the extension bearing the plug 30 can fit when the plug is in the hollow 29. The peg 27 can be seen to have axially extending slits 30 which allows its cross-sectional size to be changed, for example decreased momentarily as the peg 27 is snap-fitted into a hole 19 of a splice closure. The peg 27 can also be seen to have a barb 32 to aid such snap fitting. The slits may additionally or alternatively allow the cross-sectional size of the peg to be increased by for example the plug 30 after the peg has been positioned in the hole. In this way the peg is wedged in the hole.

In a preferred embodiment of the invention the arms 26 are joined to the sub-part 23 of the device by means of a living hinge 33. In order that the hinge be not put under stress, means may be provided such as hole 34 in arm 26 and projection 35 on the sub-part 23 that can take the strain when the arm has been pivoted, folded or otherwise moved to cause engagement between peg 27 and a hole 19 in the housing.

FIGS. 6a to 6e show various views of sub-parts 24 and 25 of FIG. 4a and FIG. 4b.

Figure 7:
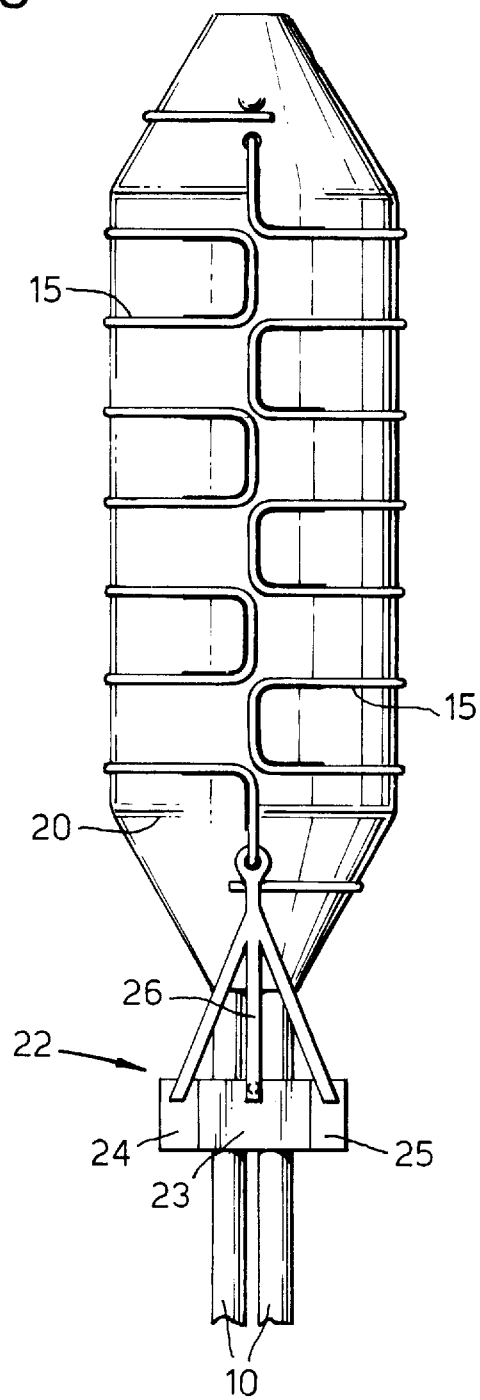
FIG. 7 shows a strain-relief device of the invention installed on a housing.

FIG. 7 shows a plan view of a cable enclosure of the invention comprising strain-relief device 22 and housing 20. As in the previous drawings, the housing comprises two parts that are held together by springs 15, and the strain-relief device comprises a first part 23, 24, 25 and arms 26.

We claim:

1. A cable enclosure comprising:
   (a) a housing having an inlet for cables;
   (b) a strain-relief device that can be connected to the cables and to the housing in strain-relieving fashion, the strain-relief device comprising:
      (i) a first part that can be attached to the cables adjacent the housing; and
      (ii) an arm attached to the first part and movable with respect to it to bring a distal end thereof into contact with the housing, the distal end having means for engaging the housing and thus connecting the strain-relief device to the housing after the first part has been secured to the cables and after the housing has been sealed around the cables, the means comprising a peg that can be inserted into a hole in the housing; and
   wherein the first part comprises three sub-parts that can be assembled around two cables with one of said sub-parts between said two cables and the other two of said sub-parts at each side of said two cables.

2. An enclosure according to claim 1, in which movement of the arm that brings the distal end thereof into engagement with the housing causes engagement between a proximal portion of the arm and a strain-relief catch of the first part.

3. An enclosure according to claim 1 further comprising an additional arm and wherein said two arms are positioned at mutually opposite sides of said first part.

4. An enclosure according to claim 1, in which the peg is hollow and has axially-extending slits such that its cross-sectional size can be altered, allowing the peg to be snap-fitted into the hole, or allowing the peg to be wedged in the hole.

5. An enclosure according to claim 4, in which the peg has a barb at its outer surface that can engage a wall defining the hole, thereby resisting removal of the peg from the hole.

6. An enclosure according to claim 4, which additionally comprises a plug that can be positioned in the hollow of the peg after the peg has been positioned in the hole, thereby resisting a reduction in cross-sectional size of the peg that would be required for removal of the peg from the hole, or causing an increase in cross-sectional size of the peg.

7. An enclosure according to claim 1, in which the housing comprises:
   a first hollow housing part;
   a second housing part that can be positioned adjacent to the first housing part such that the first and second housing parts define an enclosure space;
   a sealing material within the first hollow housing part; and
   a spring for forcing the first and second housing parts together;

at least one of the first and second housing parts having a deformable surface, and the spring having a shape which causes said surface to be deformed towards the sealing material, thereby putting the sealing material under pressure when the spring engages the first and second housing parts.

8. An enclosure according to claim 7, in which the sealing material has a cone penetration value from 10 to 350 ($10^{-1}$ mm) and an ultimate elongation of at least 200%.

9. An enclosure according to claim 7, in which the sealing material comprises a gel.

10. An enclosure according to claim 7, in which an end of the spring extends into a hole in the housing allowing pivoting of the spring with respect to the housing between a position where the spring does not force the first and second housing parts together to a position where the spring forces them together.

11. An enclosure according to claim 10, in which:
the hole in the housing into which the spring extends is the same hole that receives the peg that constitutes the means for engaging the housing.

12. A device for providing strain-relief between one or more cables and a housing into which the cables extend, the device comprising:
(a) a first part that can be attached to the cables adjacent the housing;
(b) an arm attached to the first part and movable with respect to the first part to bring a distal end of the arm into contact with the housing, the distal end having means for engaging the housing and thus connecting the strain-relief device to the housing after the first part has been secured to the cables and after the housing has been sealed around the cables; and
wherein said first part includes three subparts that can be assembled around said cables with one of said sub-parts between a first and a second one of said cables and the other two of said sub-parts at each side of said first and second one of said cables.

13. A device according to claim 12 wherein the means for engaging the housing comprises a peg that can be inserted into a hole in the housing.

14. A device according to claim 13, in which each of said sub-parts has a hole therethrough that in cross-section corresponds to part of a cross section of at least one of said cables.

15. A device according to claim 12, in which movement of the arm that brings the distal end thereof into engagement with the housing causes engagement between a proximal portion of the arm and a strain-relief catch of the first part.

16. A device according to claim 12 further comprising an additional arm and wherein said two arms are positioned substantially at mutually opposite sides of the first part.

17. A device according to claim 12, in which the arm is pivotally attached to the first part and is thus moveable by pivoting.

18. A device according to claim 17, in which the pivotal attachment is by means of a living hinge.

19. A device according to claim 17, in which the pivoting is along an axis substantially perpendicular to the cables and outside the cables.

20. A device for providing strain-relief between a cable and a housing into which the cable extends, the device comprising:
(a) a first part that can be attached to the cable adjacent the housing;
(b) an arm attached to the first part and movable with respect to the first part to bring a distal end of the arm into contact with the housing, the distal end having means for engaging the housing and thus connecting the strain-relief device to the housing after the first part has been secured to the cable and after the housing has been sealed around the cable, the means comprising a peg that can be inserted into a hole in the housing; and
wherein the peg is hollow and has axially extending slits such that its cross-sectional size can be altered, allowing the peg to be snap-fitted into the hole, or allowing the peg to be wedged in the hole.

21. A device according to claim 20, in which the peg has a barb as its outer surface that can engage a wall defining the hole, thereby resisting removal of the peg from the hole.

22. A device according to claim 20, which comprises a plug that can be positioned in the hollow of the peg after the peg has been positioned in the hole, thereby resisting a reduction in cross-sectional size of the peg that would be required for removal of the peg from the hole, or causing an increase in cross-sectional size of the peg.

23. A device according to claim 22, in which the plug is attached to the arm by a break-off extension.

24. A device according to claim 22, in which the plug is attached to the arm by a flexible extension that allows the plug to be removably positioned in the hollow of the peg.

* * * * *